Aug. 9, 1966 L. J. WESELIK 3,265,185
CAP CONVEYING AND SORTING DEVICE
Filed Oct. 2, 1964 9 Sheets-Sheet 4

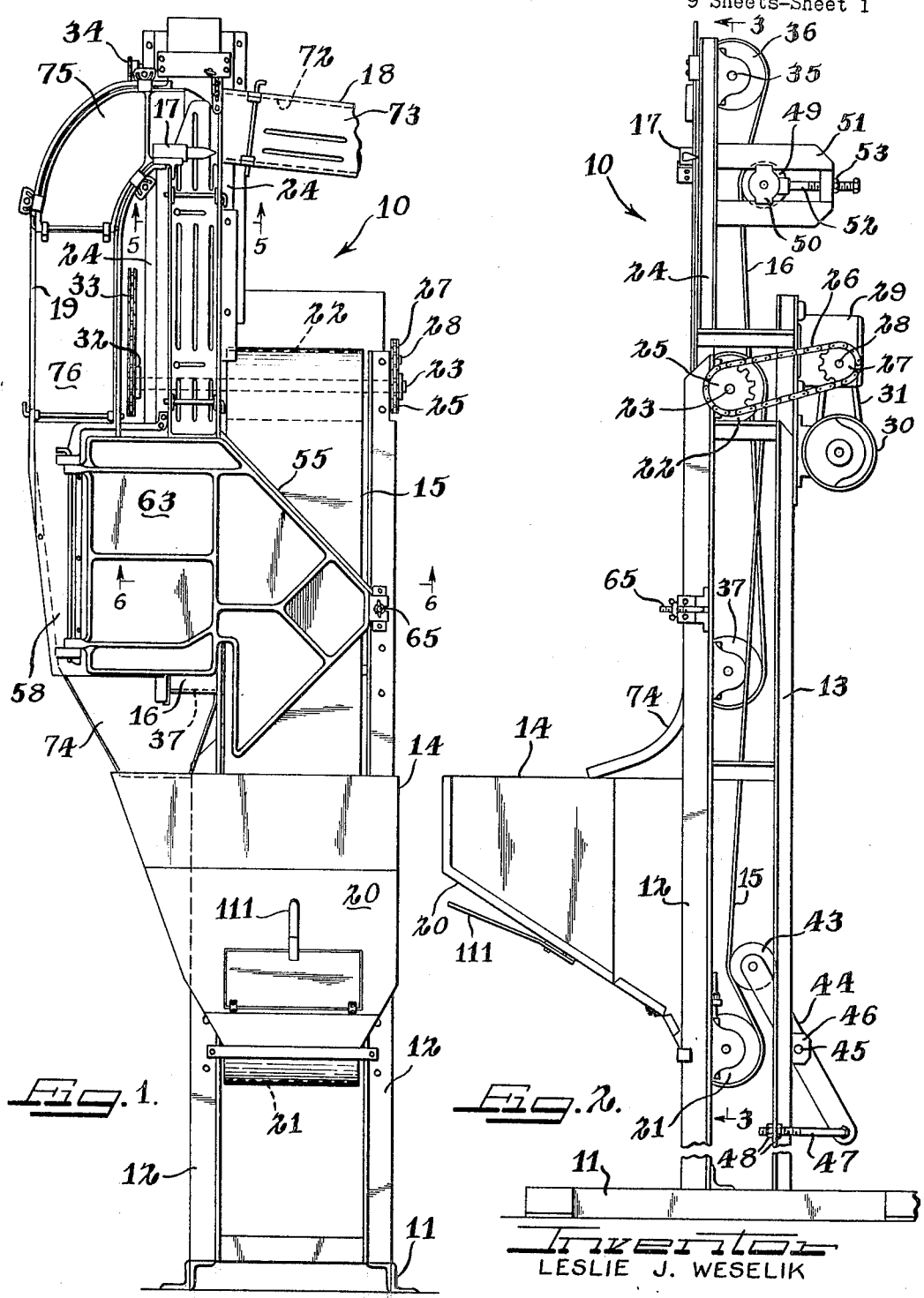

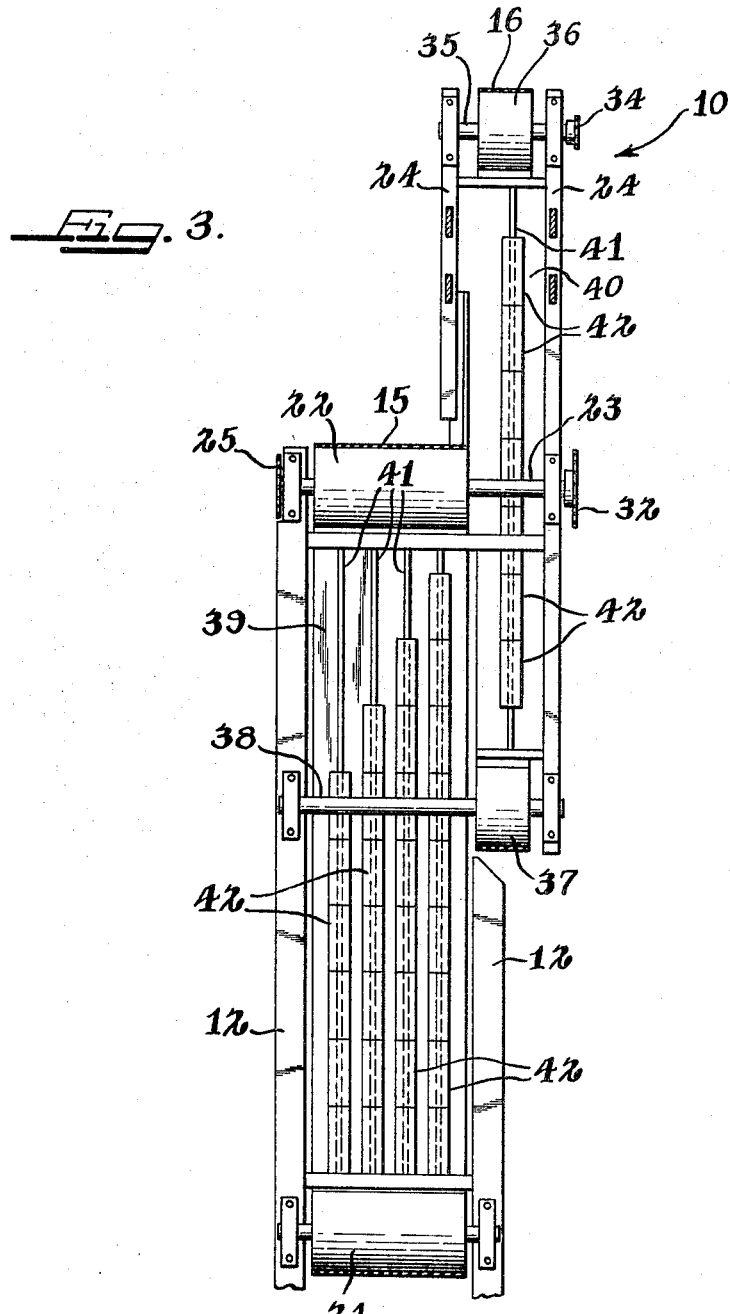

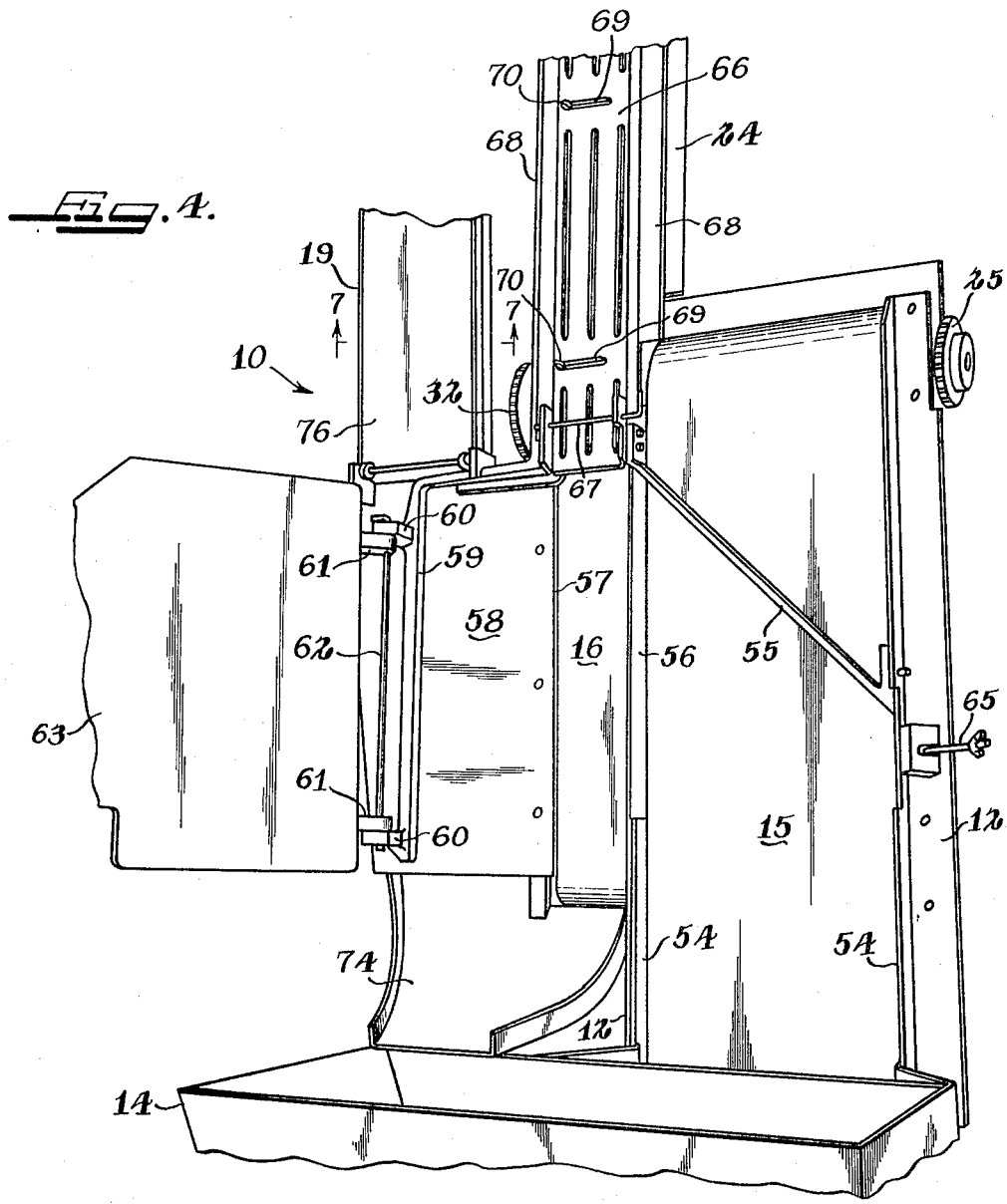

INVENTOR
LESLIE J. WESELIK by Cromwell, Greist & Warden
ATTYS.

Aug. 9, 1966    L. J. WESELIK    3,265,185
CAP CONVEYING AND SORTING DEVICE
Filed Oct. 2, 1964    9 Sheets-Sheet 6

Inventor
LESLIE J. WESELIK by Cromwell, Greist & Warden
Attys.

Inventor
LESLIE J. WESELIK
by Cromwell, Greist & Warden
Attys.

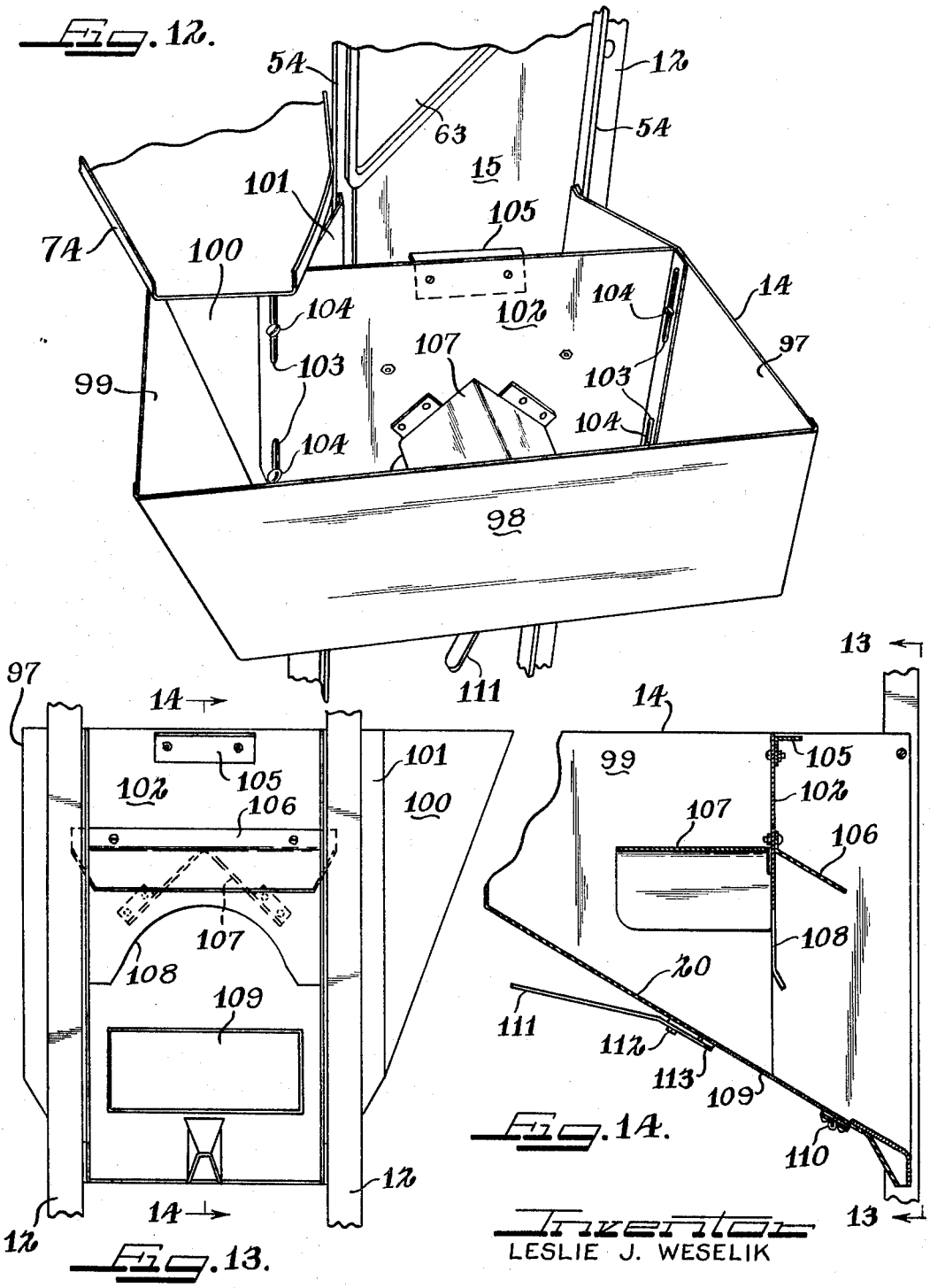

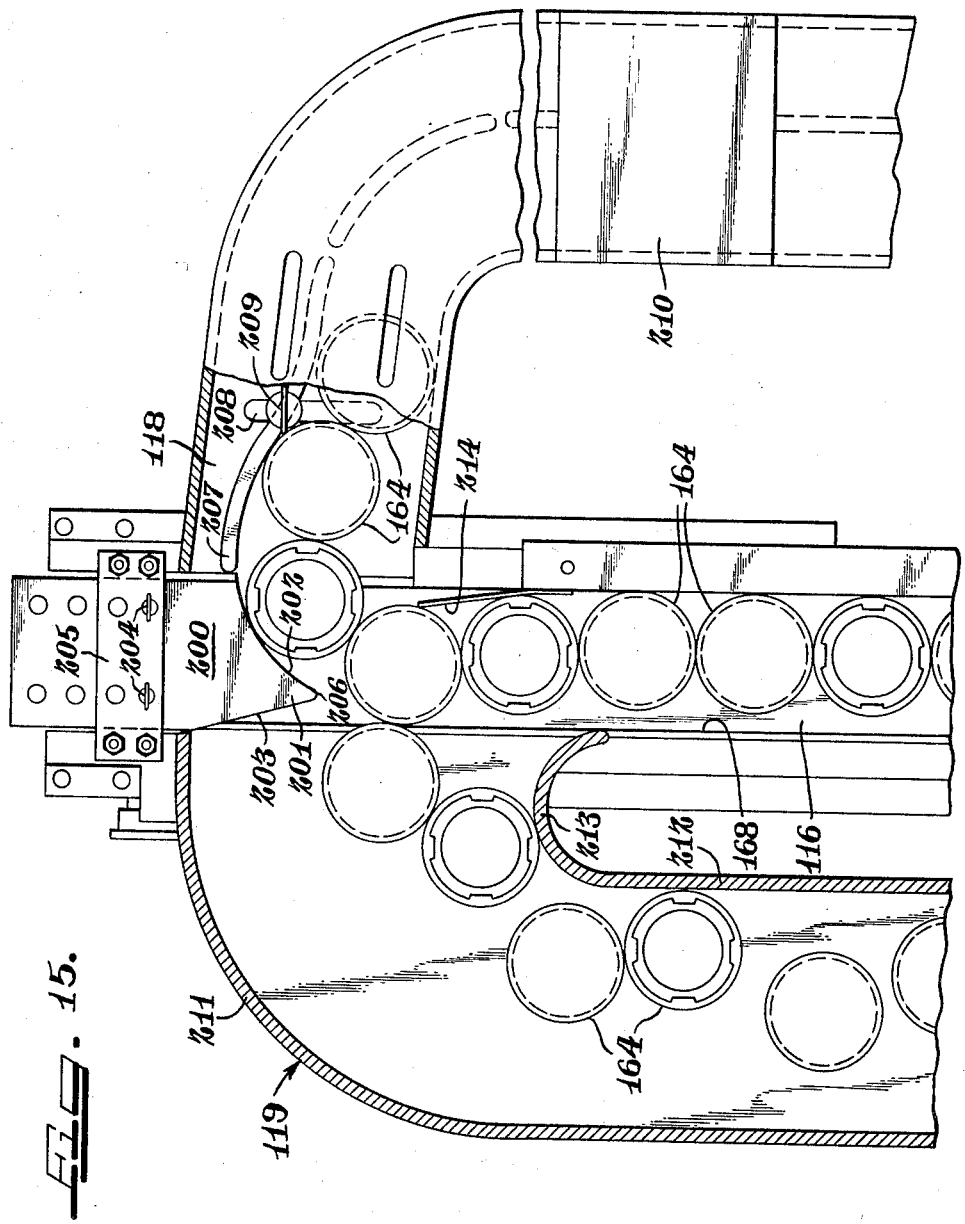

United States Patent Office 3,265,185
Patented August 9, 1966

3,265,185
CAP CONVEYING AND SORTING DEVICE
Leslie J. Weselik, Villa Park, Ill., assignor to Continental Can Company, Inc., New York, N.Y., a corporation of New York
Filed Oct. 2, 1964, Ser. No. 401,271
18 Claims. (Cl. 198—33)

This is a continuation-in-part of my application Serial No. 143,233, filed October 5, 1961, now abandoned.

This invention relates to the conveying and sorting of closure members, such as, closure caps for jars or similar containers, at high speed including the delivery of selectively sorted caps to a capping machine which also is capable of operating at high speed. More specifically, the invention is directed to a new and improved device for conveying and sorting closure members of the type formed from a metallic top panel provided with a depending skirt portion, the device making use of magnetized conveyor means of an arrangement and design permitting high speed operation to establish and maintain a sufficient supply of selectively sorted caps and feed the same to a capping machine operating at high speed. The device of the invention is in the form of a complete assembly capable of automatically handling articles such as closure caps and the like during sorting thereof.

A standard form of cap sorting device makes use of a drum-type storage means into which caps are loaded. A magnetized rotatable conveyor-like annular track is in communication with the storage drum and continuously picks up and moves caps about the drum and to a location where automatic sorting occurs. The caps selected for delivery to a capping machine are automatically separated from the drum and delivered by power driven conveyor means to the capping machine. Operation of this type of device results in tumbling of the caps within the drum and attempts toward obtaining a substantial increase in speed of operation can result in cap damage, such as involving the chipping of the protective enamel coating, possible gasket displacement and cap bending or denting.

Operational features of capping machines have been improved substantially to include among other things a material increase in the speed of capping operation. It has been found that the drum-type cap sorting device could not and should not be operated at a speed sufficient to maintain an adequate supply of caps for high speed capping machines because of the potential cap damage referred to above.

It is an object of the invention to provide a new and improved article conveying and sorting device specially adapted for use in the conveying and sorting of metallic closure members of the type having a top panel portion and depending skirt portion.

A further object is to provide a new and improved high speed closure cap conveying and sorting device which during operation at high delivery and sorting speeds handles the caps in such a manner that damage is minimized or at least substantially non-existent.

Another object is to provide a new and improved closure cap conveying and sorting device of uncomplicated design which readily facilitates the conveying and sorting of caps of different sizes and which further effectively utilizes gravity feed of caps delivered to a capping machine thereby adding materially to the simplicity of design and economical operation.

A more specific object of the invention is to provide an improved apparatus for supplying caps of the type described to a capping machine, or the like, from a storage bin where they are disposed in random arrangement, which apparatus employs a relatively slow speed magnetic belt conveyor of a width to accommodate more than a single line of caps and positioned in a generally vertical plane with the lower end of the belt traveling in an opening in the side of the storage bin so as to pick up caps from the bin in random arrangement and a relatively high speed single line magnetic conveyor disposed in coplanar side-by-side relation therewith to which the caps are transferred for delivery at its uppermost end to the top end of a downwardly directed chute which feeds the caps by gravity to a capping machine or the like, the high speed conveyor having its lower end in communication with the storage bin so as to permit return to the bin of caps delivered to the transfer area in excess of the number which the single line conveyor will accept.

Another object of the invention is to provide an improved apparatus for supplying caps of the type described to a capping machine, or the like, from a storage bin where they are disposed in miscellaneous arrangement which apparatus includes a vertically disposed relatively slow speed magnetic belt conveyor of a width to accommodate more than a single line of caps and having its lower end positioned in an opening in the storage bin so as to pick up caps from the bin and a relatively high speed magnetic conveyor of relatively narrow width which extends in coplanar side-by-side relation therewith above the storage bin to which the caps are transferred for rapid advance in side-by-side single line relation to a delivery area where they are received in the top end of a downwardly directed chute which feeds the caps by gravity to the capping machine, the high speed conveyor having its lower end in communication with the storage bin so as to permit return to the bin of caps delivered to the transfer area in excess of the number which the single line conveyor will accept and a cap orienting device associated with the feed chute for insuring that all the caps delivered to the capping machine are facing in the same direction.

Still another object is to provide an improved apparatus for supplying closure caps of the type having a center panel and a depending skirt to a capping machine, or the like, from a storage bin where they are disposed in random arrangement, which apparatus employs a magnetic belt conveyor of a width to accommodate more than a single line of caps which is driven at a relatively low speed in a generally vertical plane with its lower end positioned in an opening in the storage bin so as to pick up caps from the bin and a relatively narrow single line magnetic conveyor which is driven at a relatively high speed and disposed in coplanar side-by-side relation therewith to which the caps are transferred for delivery to the top end of a downwardly directed chute which feeds the caps by gravity to the capping machine, the high speed conveyor having its lower end in communication with the storage bin so as to permit return thereto of caps delivered to the transfer area in excess of the number which the single line conveyor will accept and having provision at the upper end of the high speed conveyor for return to the storage bin of caps which are accepted at the top end of the feed chute.

A further object of the invention is to provide an improved apparatus for handling closure caps of the type which are characterized by a center panel and a depending skirt which apparatus is adapted to withdraw caps from a storage or supply bin where they are in random arrangement and position them on a vertically disposed magnetic belt conveyor having a width to accommodate more than a single line of caps and traveling at a relative slow speed, from which the caps are transferred to a magnetic belt conveyor of lesser width which is disposed in coplanar relation therewith and which advances a single line of caps at a relatively high speed for selective delivery, according to the position in which the caps face as they reach the upper end of the conveyor, into the upper end of a feed chute or a return chute for gravity feed to a capping machine or return to the supply bin.

A still further object of the invention is to provide an improved cap handling apparatus which receives caps from a storage or supply bin where they are in random arrangement and positions them on a magnetic belt conveyor having a width sufficient to accommodate more than a single line of the caps, which conveyor is disposed in a generally vertical plane and driven at a relative slow speed and from which the caps are swept to a single line magnetic belt conveyor which is in coplanar relation with the wide belt conveyor and advances the caps at a relatively high speed for selective delivery into the upper end of either a feed chute or a return chute for gravity feed to a capping machine or return to the supply bin, the caps being selected for delivery to the respective chutes according to the position in which the caps face on the single line conveyor as they reach the delivery area adjacent the upper ends of the chutes.

These and other objects not specifically set forth will become apparent from the following detailed description of the invention made in conjunction with the accompanying drawings wherein:

FIG. 1 is a front elevation of the device of the present invention;

FIG. 2 is a fragmentary side elevation of the device;

FIG. 3 is a partly sectioned, fragmentary rear face view of the device as viewed generally along line 3—3 in FIG. 2;

FIG. 4 is an enlarged fragmentary perspective of the central front portion of the device;

FIG. 12 is a fragmentary perspective of the storage means of the device;

FIG. 13 is a fragmentary rear elevation of the storage means as viewed generally along line 13—13 of FIG. 14;

FIG. 14 is a fragmentary transverse section of the storage means taken generally along line 14—14 in FIG. 13; and FIG. 15 is a fragmentary elevation, similar to FIG. 9, illustrating another form of the device which embodies the invention with certain modifications.

Figure 5:
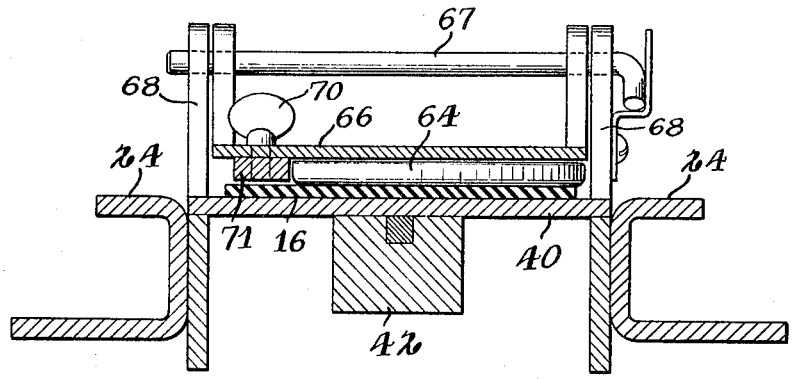
FIG. 5 is an enlarged transverse section of one of the conveyor means of the device taken generally along line 5—5 in FIG. 1.

Referring first to FIGS. 1 and 2, the cap conveying and sorting device 10 which is illustrated comprises generally a base support frame 11, a vertically upwardly extending main frame defined by spaced front beams 12 and rear beams 13, a storage or supply means in the form of a bin 14, a first magnetized conveyor means in the form of a belt 15, a second magnetized conveyor means in the form of a belt 16, a cap sorting means 17, a cap delivery chute means 18 and a cap return chute means 19. The bin 14 is directly mounted on the front beams 12 and is formed with a downwardly and inwardly inclined bottom wall portion 20 which is in communication with the bottom end portion of the belt 15. This belt extends between the front beams 12 in a vertically upward direction and the lower end thereof is mounted on an idler roller 21 suitably mounted for rotation between the front beams 12 while the upper end thereof located substantially above the bin 14 is received about a driven roller 22 suitably fixed on a drive shaft 23 which extends across from one of the front beams 12 into rotatably supported engagement with the outermost of a pair of spaced vertically directed beams 24 which mount the second conveyor belt 16 therebetween. The driven end of the shaft 23 shown in FIG. 2 has fixedly attached thereto a sprocket 25 engaged with a drive chain 26 interconnecting the sprocket with a drive sprocket 27 mounted on a drive shaft 28 extending into a gear reduction box 29 suitably supported by the rear beam 13. The shaft 28 is suitably driven by a variable motor 30 supported by the rear beams 13 and connected to the gear box 29 through a drive belt 31. The opposite end of the drive shaft 23 as shown in FIGS. 1 and 3 has attached thereto a relatively large sprocket 32 engaged with an upwardly directed drive chain 33 which is attached to a smaller sprocket 34 (FIG. 3) fixed on a drive shaft 35 rotatably mounted between the beams 24 at the top ends thereof. The shaft 35 has fixedly mounted thereon a drive roller 36 engaged with the upper end of the conveyor belt 16 to drive the same. The lower end of the conveyor belt 16 is received about an idler pulley 37 mounted on a rotatable shaft 38 suitably journaled at one end in the outermost beam 24 and at the other end in the outermost beam 12. The gearing arrangement defined by the relative size of the sprockets 32 and 34 is such that the belt 16 is driven at a substantially greater speed than the belt 15, for example, on the order of a ratio of about 6 to 1.

The endless belts 15 and 16 are arranged with their outer faces exposed between their respective beams 12 and 24. The belt 15 is of substantial width as compared to the belt 16 and these belts are magnetized as best illustrated in FIG. 3. The paired beams 12 and 24 suitably mount therebetween magnet supporting plates 39 and 40, respectively. These plates are formed with at least one vertically extending rib 41 on which block-like permanent magnets 42 are mounted. The magnets are of known type being provided with longitudinal grooves receiving the ribs 41, the magnets being placed in end-to-end engagement in a vertical direction. It will be noted that the series of magnets mounted rearwardly of the wide belt 15 are arranged in a plurality of rows with the top portions of such rows being extended in staggered relation in a direction toward the lower end portion of the narrow belt 16. This defines the controlled path of movement of the caps toward the narrow belt 16 in a manner to be described. The series of magnets 42 mounted rearwardly of the narrow belt 16 may consist of a plurality of rows if desired, it being the purpose merely that sufficient magnets be mounted in the device to provide for efficient retention of metallic caps to the faces of the belts during high speed operation of the device. Any suitable means may be utilized to fix the magnets in the positions illustrated.

Referring particularly to FIG. 2, each belt is provided with a suitable slack adjustment means. The belt 15 near the lower end thereof and on the rear face thereof is engaged by a roller 43 carried on an arm 44 pivotally attached by a pin 45 to attachement flanges 46 supported on the rear beams 13. The pivot pin 45 is located centrally of the arm 44 and the opposite lower end of the arm is pivotally attached to an adjustment rod 47 having a threaded outermost end portion received through cooperating nuts 48 engaging the rod through the rear beam 13. Adjustment of the rod 47 controls tilting of the roller 43 toward and away from the belt 15 to adjust the slack thereof.

Slack adjustment of the belt 16 is brought about by means of a roller 49 journaled on a pair of sliding support members 50 which are received in a horizontal track frame 51 suitably attached to the beams 24. An adjustment rod 52 extends into engagement with the members 50 and is movable through the track frame 51 to different positions as fixed by a nut 53 mounted on the outer threaded portion thereof. With this arrangement the roller 49 may be moved toward and away from the belt 16 to adjust the slack thereof.

Generally, the device 10 of the invention makes use of cooperating magnetized conveyor means including a first conveyor means of substantial width which delivers a substantial number of caps to a second conveyor means of reduced width on which the caps are guided into single alignment. The second conveyor means operates at a much higher speed than the first conveyor means and delivers the single line of caps to a sorting means which accepts and rejects caps and automatically guides the same either into an accepted cap delivery chute, when the latter is free to accept caps directed to the entry end thereof or to a rejected cap return chute. The arrangement described is preferably established in a vertically upstanding plane to efficiently utilize gravity in high speed delivery of accepted caps through the cap delivery chute or cap feeding chute to a capping machine (not shown) and high speed return of rejected caps through the cap return chute to the storage bin 14 for pick up by the belt 15.

Figure 6:
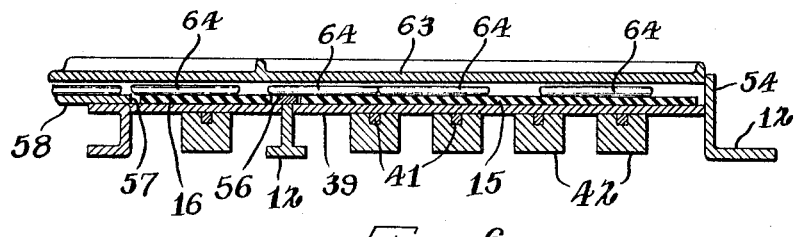
FIG. 6 is an enlarged fragmentary, transverse section of the cooperating conveyor means of the device taken generally along line 6—6 in FIG. 1.

FIG. 4 illustrates the preferred relative positioning of the cooperating conveyor means in carrying out the intended operation of the device 10. The beams 12 are formed with outwardly projecting, vertically continuous flanges 54 located to each side of the belt 15 to provide for cap retention thereon during upward movement of the caps on the belt. Near the upper end of the belt 15 a cap guide member 55 extends angularly thereacross This guide member is in the form of a bar attached at its lowermost end to the outermost side flange 54 and attached at its uppermost end to a portion of the beam 24. The bar 55 functions to limit the upward movement of caps on the belt 15 and guides the same toward the lower end of the belt 16. The belt 16 is arranged in side-by-side relation with the top portion of the belt 15 and constitutes an upward continuation thereof extending substantially vertically above the belt 15. A cross-over flat plate member 56 is located between the belts 15 and 16 to permit ready movement of caps from the belt 15 onto the belt 16. The outermost edge of the belt 16 has associated therewith the side margin 57 of a coplanar cover plate 58 which suitably extends over the lower end portion of the cap return chute 19. The plate 58 includes a cover plate frame member 59 having spaced hinge portions 60 attached to cooperating hinge portions 61 by a hinge pin 62 and attaching to the device a pivotal cover plate 63. This cover plate as best shown in FIG. 1 extends in covering relation with the lower portion of the belt 16 and the portion of the belt 15 immediately above the bin 14 and below the guide bar 55. The cover plate functions to prevent displacement of caps from the associated belt portions during high speed operation. FIG. 6 illustrates the confining action of the cover plate 63 relative to caps 64 being delivered by the belt 15 onto the belt 16. This view also illustrates the operative functioning of the cross-over plate 56 and the cover plate 58. The edge 57 is closely associated with the belt 16 and the cover plate 58 is in coplanar relation therewith to receive caps thereon for return to the bin 14 to prevent jamming of the device. Suitable detachable locking means 65 are mounted on the outermost beam 12 for cooperation with the cover plate 63 to hold the same in operative position as best shown in FIG. 1.

The upper portion of the belt 16 extending between the beams 24 is provided with a removable cover plate 66 which is slotted to permit observance of cap movement therebeneath. The plate 66 extends from above the top edge of the cover plate 63 in association with the top end of the guide bar 55 and is suitably removably mounted by a locking arrangement including a transverse pin 67. Referring particularly to FIG. 5, the belt back-up plate 40 located between the beams 24 and on which the magnets 42 are mounted includes outwardly projecting guide plates 68 located to each side of the belt 16 and functioning to retain the caps 64 on the belt in cooperation with the cover plate 66. As best shown in FIG. 4, the cover plate 66 is provided with a plurality of vertically spaced lateral slots 69 having received therethrough lock screws 70 which are engaged with a vertically directed guide bar 71 (FIG. 5) located between the inner surface of the cover plate 66 and the outer surface of the belt 16 along one side margin of the belt 16. The guide bar 71 may be movably adjusted laterally across a substantial portion of the belt 16 to define the space for passage of a single row of caps 64 vertically upwardly. With this arrangement adjustment is provided for utilization of the device 10 with caps of different sizes.

Figure 7:
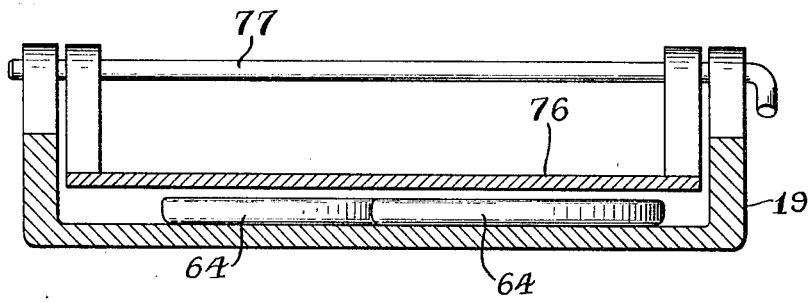
FIG. 7 is an enlarged transverse section of the cap return chute of the device taken generally along line 7—7 in FIG. 4.
Figure 9:
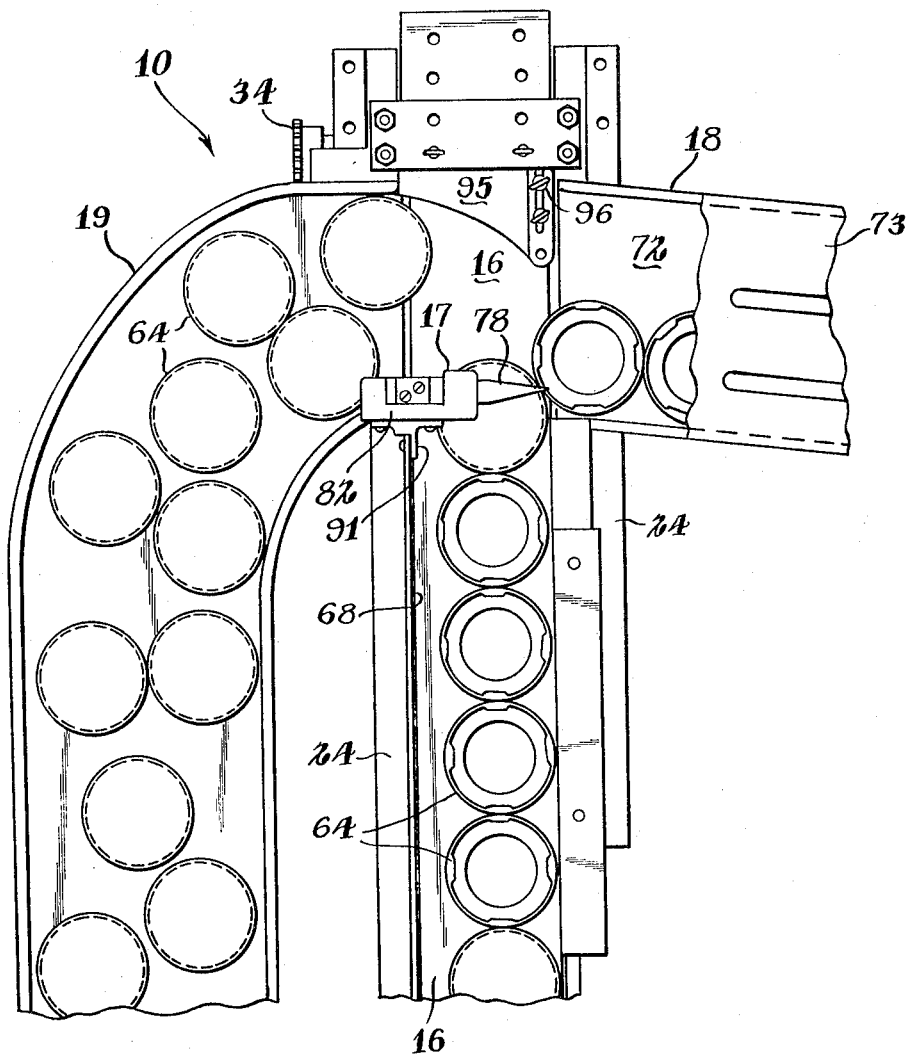
FIG. 9 is a fragmentary elevation of the cap sorting portion of the device, this view constituting a continuation of the top portion of the device shown in FIG. 8.

The accepted cap delivery chute 18 shown in FIGS. 1 and 9 is suitably arranged in association with the top end portion of the belt 16 to receive caps through the upper, entrance forming, end thereof from one side of the belt 16 which are directed thereto by operation of the sorting device 17. The chute 18 may be of any suitable design such as including a channel-like bottom portion 72 in which the caps 64 are confined by a removable cover plate 73. The delivery chute 18 is arranged at a downwardly inclined angle relative to the belt 16 to permit movement of caps therealong in response to the action of gravity. Thus, the vertical arrangement of the device 10 permits efficient utilization of the forces of gravity in the delivery of accepted caps to a capping machine while yet permitting ready access for cap loading and unloading by reason of the bottom positioning of the storage bin 14. The rejected cap return chute 19 has its upper cap receiving or entrance end located to the opposite side of the belt 16 relative to the entrance end of the accepted cap delivery chute 18. As illustrated in FIG. 1, the cap return chute 19 extends outwardly and downwardly from the top end of the device behind a portion of the hinged side of the cover plate 63 and ultimately terminates at its lowermost end in an open chute portion 74 placed in communication with the open top of the bin 14 to one side of the belt 15. Suitable cover plate sections 75 and 76 cover the uppermost end of the return chutes 19 while the plate section 58 previously described covers the lowermost end of the chute behind the cover plate 63 and immediately above the open bottom chute portion 74. FIG. 7 illustrates the return chute 19 as being generally channel-shaped with caps 64 sliding downwardly in response to the force of gravity and held in the chute by the removable cover plate section 76. A locking pin 77 holds the cover plate section 76 in place.

FIG. 4 illustrates the lowermost open chute portion 74 as curving outwardly into bottom end communication with the top opening of the storage bin 14. This chute portion also extends to one side into communication with the bottom end of the belt 16 to receive therefrom any caps which might be displaced during high speed operation of the belt. Thus, the bottom open chute portion 74 provides a dual function of controlled cap return from both the return chute 19 and belt 16.

Figure 8:
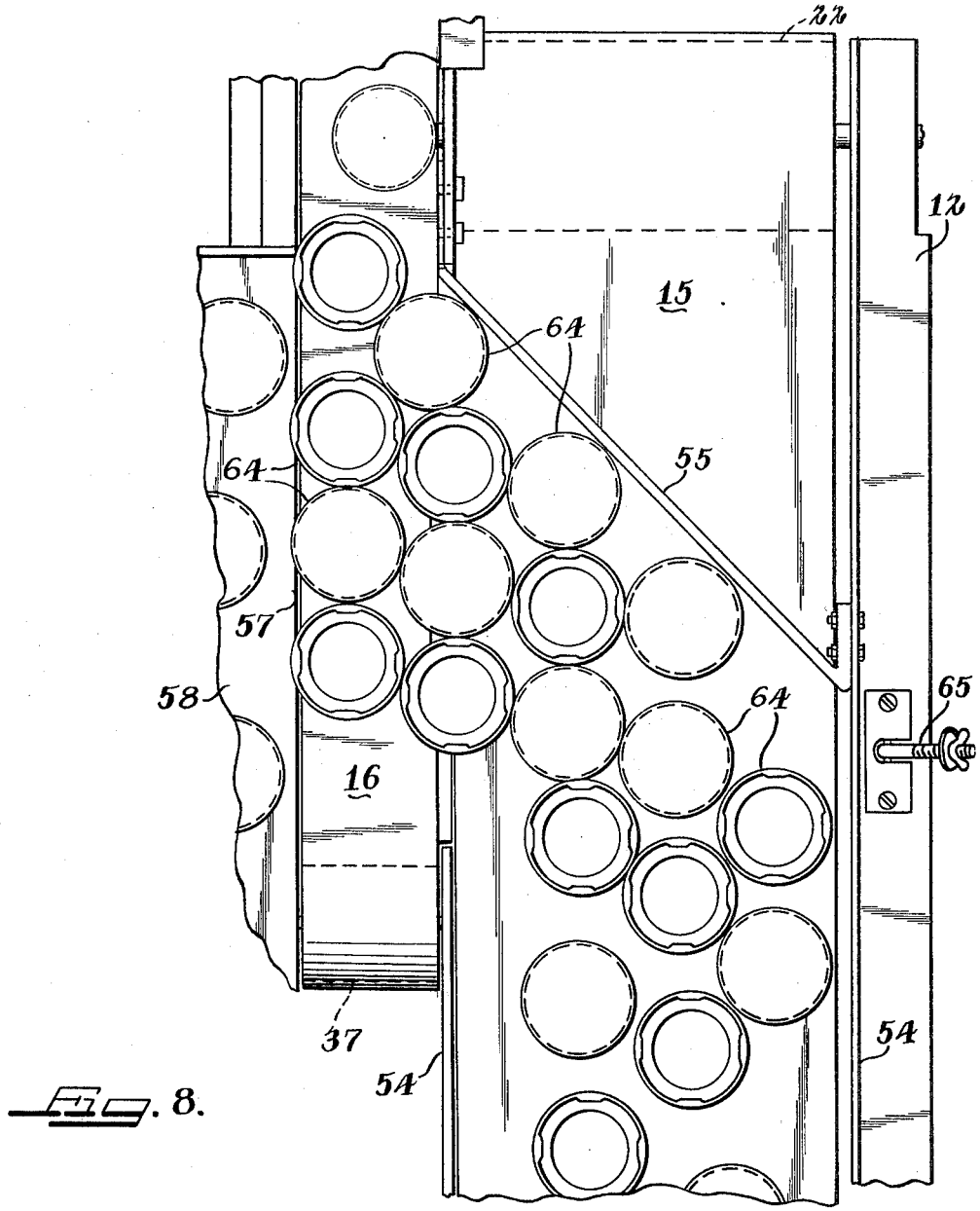
FIG. 8 is a fragmentary elevation illustrating the cooperation between the conveyor means of the device during cap delivery.

FIG. 8 illustrates operation of the device 10 during transfer of caps 64 from the wide belt 15 operating at a relatively low speed onto the narrow high speed belt 16. A substantial number of caps are picked up by the belt 15 from the storage bin 14 and moved upwardly with the belt 15 until the caps engage the transverse guide bar 55. The caps then begin to slide on the belt 15 and by reason of the continued supply of more caps by the belt, the congested group of caps limited against further upward movement by the guide bar 55 slide across the belt 15 onto the belt 16. The belt 16 traveling at a very high speed picks up the caps delivered thereunto in single line as limited by the effective available width of the belt 16. The caps then move upwardly along the belt 16 in close single order to the sorting device 17 located near the upper end thereof. With this arrangement the belt 15 always supplies an adequate number of caps to permit efficient and continuous high speed operation of the belt 16. Furthermore, the caps are picked up from the storage bin 14 at a relatively slow speed, thus preventing excessive tumbling or turbulence in the storage bin which can result in cap damage. Any excess caps supplied by belt 15 to belt 16 will be displaced over the marginal edge 57 of plate 58 which is coplanar with belt 16 and will slide down the forward face of plate 58 and drop onto the open bottom chute portion 74 and then back into the storage bin 14. This constitutes an important aspect of the device as in this manner, jamming the cap receiving area of belt 16 at high speed operation is eliminated.

FIG. 9 illustrates the top end portion of the device 10 including the sorting device 17 associated with the top end portion of the belt 16. The sorting device 17 is illustrated in detail in FIGS. 10 and 11 and makes use of a known type of bowed resilient sorting fingers 78 formed from spring metal or the like. The finger 78 is mounted at the base thereof by fasteners 79 to a pivotal block 80 which extends under a stop plate portion 81 formed integral with a mounting member 82 including a shaft journaling portion 83 extending to one side of the block 80 and a relatively thin attachment portion 84 which at the rearmost end thereof is formed with an enlargement 85. The finger mounting block 80 is journaled by a bushing 86 on a shaft 87 extending therethrough and into the portion 83 of the mounting member 82. The shaft 87 is fixed in the portion 83 by a set screw 88. The rearward extension of the block 80 has attached to the top surface thereby by fasteners 89 a resilient leaf spring 90 which at its opposite end is fixed in the enlarged portion 85 of the mounting member 82. This mounting member is fixedly attached to a T-shaped mounting bracket 91 by fasteners 92 and the bracket is fixed to the top end portion of a side flange 68 by a fastener 93.

Figure 10:
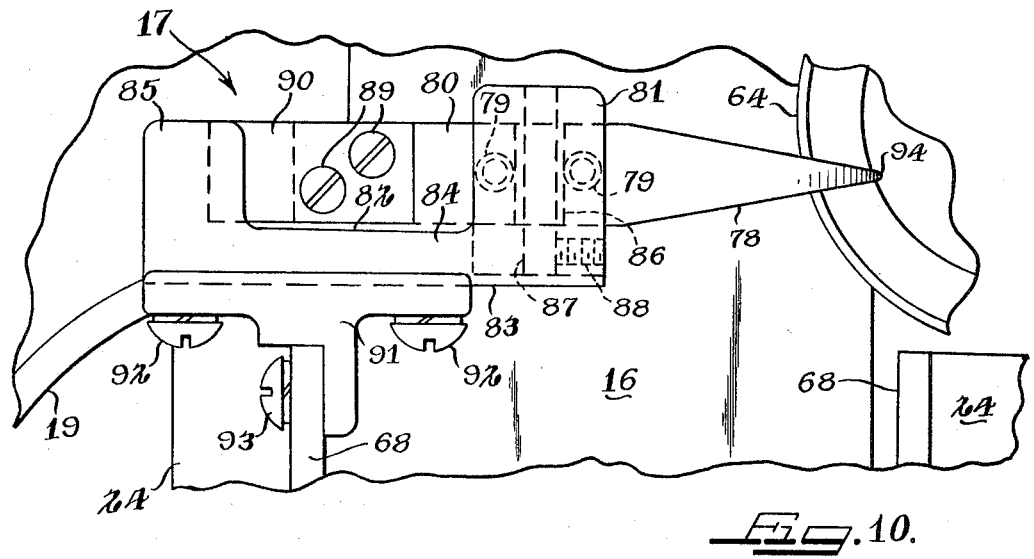
FIG. 10 is an enlarged fragmentary top plan view of one form of sorting means used with the device.

FIG. 10 best illustrates the clearance between the finger mounting block 80 and the overhanging stop plate portion 81 of the mounting member 82. With this arrangement, the block 80 is provided with limited pivotal action about the shaft 87 and is continually urged into the position shown by the leaf spring 90. The resilient finger 78 projects downwardly and outwardly from the block 80 as illustrated and tapers toward its outermost end which is in the form of a blunt point 94. The sorting action of the resilient finger 78 is well known and this particular sorting device per se does not constitute a part of the invention. Any suitable sorting device may be utilized with the apparatus herein disclosed.

Figure 11:
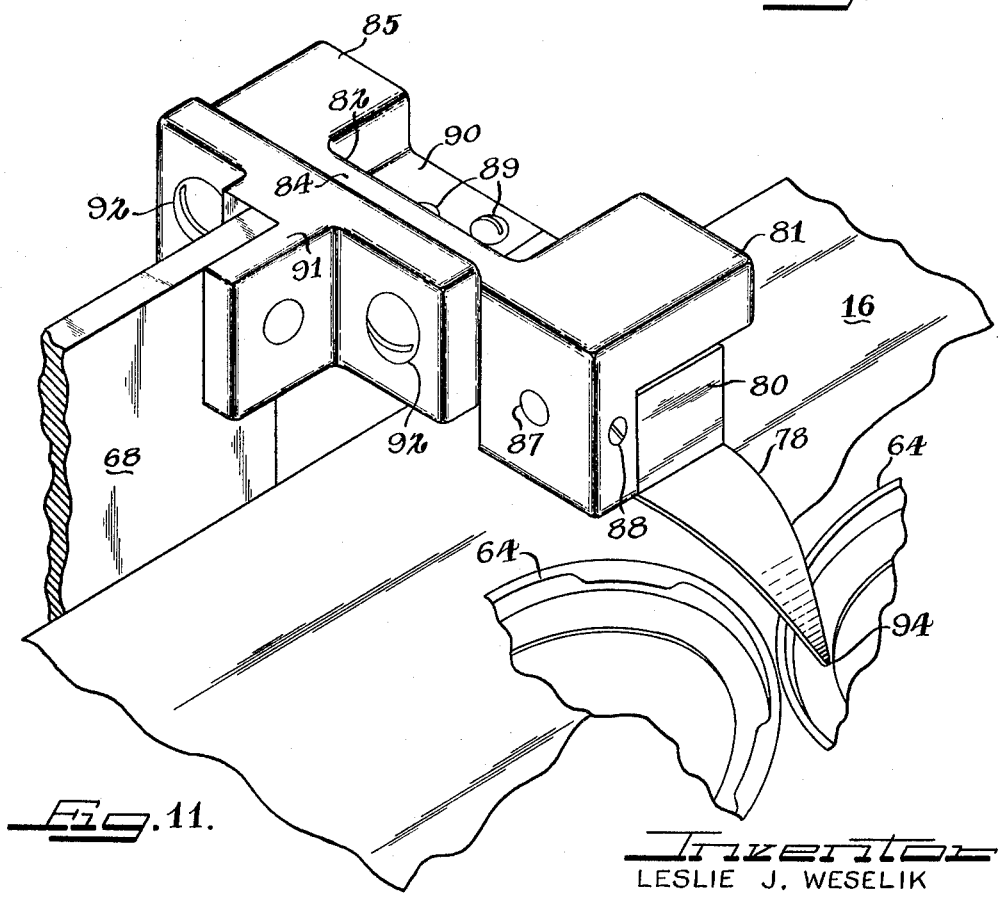
FIG. 11 is a fragmentary perspective of the sorting means of FIG. 10.

The resilient sorting finger 78 generally functions to ride over the outer surface of the top panel of a cap 64 when the same is positioned on the belt 16 with the outer surface of the top panel exposed. When a cap 64 is positioned on the belt 16 with the depending skirt portion projecting outwardly from the belt as shown in FIGS. 10 and 11, the blunt end 94 of the resilient finger moves into the interior of the cap and provides a pivot point against the inner surface of the depending skirt portion by means of which the cap normally pivots about the finger to the right as viewed in FIG. 9 and into the accepted cap delivery chute 18. Thus, all of the caps 64 guided into the delivery chute 18 by the finger 78 are in the same position, namely, with the depending skirt portions and inner surfaces of the top panels exposed to view as shown in FIG. 9. The remaining caps 64 with the outer surfaces of their top panels exposed move under the finger 78 and ultimately engage the exposed edge of a guide plate 95 adjustably mounted by fasteners 96 directly over the top portion of the belt 16. The rejected caps by reason of being continuously moved upwardly by the belt 16 and the pressure of the caps behind them slide along the edge of the plate 95 which is curved to direct the same into the return chute 19. When the delivery chute 18 is filled or, due to any other reason blocking of the entrance thereto occurs, caps which are facing so that they would normally be guided into the chute 18 by the finger 78, will slide past the finger 78 and be deflected by guide 95 into the return chute 19 along with the caps facing in the opposite direction. It will be appreciated that the sorting device 17 may be mounted in the opposite direction with suitable rearrangement of the cooperating parts of the device 10 to accept caps having the outer surface of their top panels exposed for delivery to the chute 18 and through the same to the capping machine. The important function of the sorting device 17 is to provide for the delivery of caps which are all in the same position into the chute 18 for handling by the capping machine and application to a container.

The resilient sorting finger 78 is dimensioned and positioned to merely engage the depending skirt portion of a cap 64 without scratching the interior thereof or become embedded in the gasketing material applied thereto. The finger 78 is resilient in and of itself and added resiliency is added by the leaf spring arrangement 90 with limited pivotal movement of the finger mounting block 80.

The storage bin 14 is illustrated in FIGS. 12–14. This bin is formed from generally converging wall portions and includes side wall sections 97, 98, 99, 100 and 101. A transverse dividing wall section 102 extends between the wall sections 97 and 101 and subdivides the wall section 97. The dividing wall section 102 is provided with side flange portions having spaced vertical slots 103 therein for vertical adjustment by use of clamping screws 104. The dividing wall section 102 subdivides the bin into an outwardly located storage area and an inwardly located cap feeding area through which the belt 15 moves in a vertical direction between the open ends of the side wall sections 97 and 101. The dividing wall section 102 along a top marginal portion thereof is provided with a lifting plate 105 and below this plate a pair of oppositely directed baffles 106 and 107. The baffle 106 is in the form of an outwardly and downwardly inclined plate which extends into the cap feeding area above a semi-circular cap delivery opening 108 formed in the bottom central portion of the dividing wall section 102. The baffle 107 is of generally V-shape and extends outwardly from the dividing wall section 102 into the cap storage area above the cap delivery opening 108. The baffles 106 and 107 provide protection for the caps accumulated in the storage and feeding areas in the event that caps fall from the belt 15 back into the feeding area and are dumped in large quantities into the storage area during replenishing of the cap supply.

As previously described, the bin 14 is provided with a downwardly and inwardly inclined bottom wall section 20 which provides for gravity delivery of caps through the delivery opening 108 into the cap feeding area through which the belt 15 moves. A portion of the bottom wall section 20 directly below the cap delivery opening 108 and extending into the cap storage and feeding areas is formed with a drop gate 109. The gate is attached along one marginal portion by hinges 110 and is held in place along the opposite marginal portion by a locking lever 111. The locking lever 111 includes a pivot point defined by a fastener 112 and a projecting locking portion 113 which extends over the marginal edge of the drop gate 109. Opening of the drop gate 109 provides for substantially complete removal of caps from the bin 14. Such removal occurs where the device 10 is to be used for the sorting of caps of a different size. Adjustment of the dividing wall section 102 controls the size of the delivery opening 108, to accommodate different sizes of caps and variations in the speed of operation of the sorting device 10.

The cap delivery and sorting device described is capable of supplying sorted caps at speeds substantially in excess of those obtained by operation of the standard type of barrel-like device. By way of example, the device of the present invention can operate with 82-millimeter caps at the rate of about 500 caps per minute. The speed with 48 millimeter caps extends to about 1200 caps per minute. With 27-millimeter caps, the machine can operate at speeds above 1800 caps per minute. Standard devices, by way of example, operate on the order of about 700 caps per minute using 48-millimeter caps. As previously described, the device of the present invention protects the caps being sorted from damage by completely eliminating any substantial tumbling action in the cap storage bin. The loading area is at a convenient level while the device makes full utilization of gravity feed of accepted caps to a capping machine. The device is readily adapted for operation with different sizes of caps.

A modified form of the device is illustrated in FIG. 15 which is adapted to operate at still greater speeds and which may be useful when the device is employed, for example, with some ultra-high speed capping machines. In the modified form of the device, in which elements corresponding to the elements incorporated in the device of FIG. 1 are identified by the same numerals plus 100, the caps 164 are carried in single line arrangement to a discharge area at the top of the high speed magnetic conveyor 116 where they are guided into the feed chute 118 for delivery to a capping machine (not shown). The caps 164 are advanced by the conveyor 116 in a single line to a guide plate member 200 which has a generally triangular shaped portion 201 projecting downwardly into the path of the caps and presenting angularly related guideway forming edges 202 and 203 which face in the direction of the mouth or entrance end of the feed chute 118 and a return chute 119, respectively, the return chute 119 serving to accommodate caps 164 which are not accepted by the feed chute 118 and returning the caps to the storage bin, the storage bin and adjoining apparatus for the modified device embodying the same structure and operation as in the device illustrated in FIGS. 1 and 8. The guide plate 200 is adjustably mounted by means of a pair of clamping bolts 204 on a fixed frame plate 205, with the lowermost tip 206 or the apex formed at the junction of guide edges 202 and 203 on the guide plate member 200 disposed to the left of the center-line, as viewed in FIG. 9, of the line of caps advanced on the conveyor 116 so that the leading cap 164 in the line will normally strike the edge 202 and be guided into the chute 118 when the entrance to the latter is unobstructed. A guide bar assembly 207 has a curved trailing end section which is adjustably mounted in the mouth of the chute 118 by means of the slot 208 in the bottom or back wall of the chute 118 and the fastening bolt 209, so that it provides a continuation of the guide edge 202 and brings caps diverted from the conveyor 116 along the guide edge 202 into single line arrangement for advance in such arrangement in the chute 118. The caps are advanced in the chute 118 to a capping machine with a cap orienting or cap turn over device, indicated at 210, of known construction being interposed in the chute 118 between the upper cap receiving end thereof and the capping machine to turn or reorient any caps which are facing in the wrong direction so that all the caps arrive at the capping station in proper position for application to the jars or other containers. A cap orienting device suitable for this purpose is shown in Patent No. 2,440,959, granted May 4, 1948, to Ernest A. Krueger. Another suitable device is disclosed in the co-pending application of Douglas E. Beck, Ser. No. 378,325, filed June 26, 1964. The cap return chute 119 has an outside wall 211 which terminates adjacent the top of the guide edge 203 and an inside wall 212 with a reversely curved top portion 213 which merges into side wall 168 of the conveyor 116 at a point which is a sufficient distance below the apex 206 of the guide plate member 200 to permit caps to advance into the mouth of the chute 119 when their upward passage is blocked by a jam-up at the mouth of the chute 118 due to stopping of the flow of caps to the capping machine or for any other reason. A small leaf spring 214 is mounted in the conveyor 116 at the approach to the mouth of the chute 118 to urge the caps slightly out of line as they advance to a position opposite the mouth of the chute 119 and approach the guide plate member 200. This relieves any tendency for the caps to freeze in the line if there is a jam-up and insures that each oncoming cap will be guided either into the feed chute 118 or the return chute 119. With this arrangement the caps may be fed at very high speeds not possible with any other equipment heretofore designed and with a minimum of damage. The cap handling conveyors including conveyor 116 may run continuously and any temporary failure of the feed chute 118 to accept the caps from the conveyor 116 is taken care of without stopping the cap feeding operation. Time delay switches may be associated with the apparatus for stopping the cap conveyors when the capping operation is shut down or discontinued for a predetermined period.

Obviously, certain modifications and variations of the invention as hereinbefore set forth may be made without departing from the spirit and scope thereof, and therefore, only such limitations should be imposed as are indicated in the appended claims.

I claim:

1. A high speed closure cap sorting and delivery device adapted for use with metallic caps having a depending annular skirt portion, said device comprising cap storage means, a first magnetized vertically directed endless conveyor of substantial width arranged with the lower end portion thereof in close association with said cap storage means to magnetically pick up a relatively great number of caps in flat condition thereon from said storage means and lift the same, first drive means connected to said first conveyor to drive the same at a relatively slow speed, a second magnetized vertically directed endless conveyor arranged to one side of said first conveyor in close association therewith throughout a substantial portion of said first conveyor above said storage means, said second conveyor being of a width limited to the accommodation of a single line of caps and extending substantially upwardly beyond the upper end of said first conveyor, second drive means connected to said second conveyor to drive the same at a high speed, cap guide means extending angularly across the upper end portion of said first conveyor in the direction of said second conveyor to provide for cap delivery thereonto, the upper end of said second conveyor being in communication with downwardly inclined cap delivery means for gravity feed of accepted caps to a capping machine, said upper end further being in communication with a downwardly directed rejected cap return chute which is in communication with said storage means, and cap sorting means operative relative to the upper end of said second conveyor to accept and reject caps and direct the same into said cap delivery means and return chute, said cap sorting means comprising a bowed resilient finger arranged to flexibly slide over the outer continuous surface of the top panel of a cap and resiliently engage the inner surface of a skirt portion of a cap in which position the cap pivots relative to said finger for controlled directional movement.

2. A high speed closure cap handling device adapted for use with metallic caps having a top panel and a depending annular skirt, said device comprising cap storage means, a first magnetized vertically directed endless conveyor of substantial width arranged with the lower end portion thereof in close association with said cap storage means to magnetically pick up a relatively great number of caps in flat condition thereon from said storage means and lift the same, first drive means connected to said first conveyor to drive the same at a relatively slow speed, a second magnetized vertically directed endless conveyor arranged to one side of said first conveyor in close association therewith throughout a substantial portion of said first conveyor above said storage means, said second conveyor being of a width limited to the accommodation of a single line of caps and extending substantially upwardly beyond the upper end of said first conveyor, second drive means connected to said second conveyor to drive the same at a high speed, cap guide means extending angularly across the upper portion of said first conveyor in the direction of said second conveyor to provide for cap delivery thereonto, means forming a downwardly inclined cap delivery chute for gravity feed of accepted caps to a capping machine which cap delivery chute has an upper cap entrance positioned adjacent the upper end of said second conveyor and in communication therewith, means forming a separate downwardly directed cap return chute for rejected caps which has an upper cap entrance positioned adjacent the upper end of said second conveyor and in communication therewith and said return chute having a bottom end in communication with said storage means, said chutes having their cap receiving entrances adjacent each other, and cap position sensing and guiding means disposed at the upper end of said second conveyor to accept and reject caps in accordance with the position of the cap panel and skirt and to guide the caps so that they normally move into the respective chute entrances according to the position in which the caps face, said cap position sensing and guiding means cooperating with the conveyor in directing all the caps into said cap return chute without regard to the relative position of the cap panel and skirt when the cap entrance to said cap delivery chute is blocked so that it will not accept caps guided thereto.

3. The device of claim 2 wherein the bottom end of said cap return chute which is in communication with said storage means also extends across the bottom end of said second conveyor for the return to said storage means of caps displaced from said second conveyor.

4. The device of claim 2 wherein the cap entrances to said chutes are disposed opposite each other and said cap sensing and guiding means is operative to guide accepted caps into the one chute by changing the direction of movement thereof and to permit rejected caps to advance into the oppositely disposed entrance to the other chute.

5. A high speed closure cap sorting and delivery device adapted for use with metallic caps, said device comprising cap supply means in the form of an open top bin including a cap delivery opening, a first magnetized vertically directed endless conveyor of substantial width arranged with the lower end portion thereof in close association with said cap delivery opening to magnetically pick up a relatively great number of caps in flat condition thereon from said bin and lift the same above said bin, drive means connected to said first conveyor to drive the same at a relatively slow speed, a second magnetized vertically directed conveyor arranged at one side of said first conveyor in close association therewith throughout a substantial portion of said first conveyor above said bin, said second conveyor being of a width limited to the accommodation of a single line of caps and extending substantially upwardly beyond the upper end of said first conveyor, drive means connected to said second conveyor to drive the same at a high speed, cap guide means extending angularly across the upper portion of said first conveyor in the direction of said second conveyor so as to guide caps in side-by-side random arrangement from said first conveyor to said second conveyor, the upper end of said second conveyor being in communication with the cap receiving upper end of a downwardly inclined cap delivery chute for gravity feed of caps to a capping machine, said upper end of said second conveyor being also in communication with the cap receiving upper end of a downwardly directed cap return chute which has its bottom end in communication with said bin, and means disposed at the upper end of said second conveyor and between the upper cap receiving ends of said chutes to engage the caps and guide caps facing in one direction into said cap delivery chute and caps facing in the opposite direction into said cap return chute, said cap engaging means being operative to permit caps facing in said one direction to advance into said cap return chute when the upper end of the cap delivery chute is blocked so that it will not accept caps guided thereto.

6. The device of claim 5 wherein closure plate means extend across a portion of said first conveyor positioned above said bin and across the adjacent lower portion of said second conveyor so as to limit the caps advancing thereon to side-by-side single plane arrangement.

7. The device of claim 5 wherein the bottom end of said cap return chute which is in communication with said bin also extends across the bottom end of said second conveyor for the return to the bin of caps displaced therefrom due to an excess of caps on the second conveyor.

8. The device of claim 5 wherein cap surface return means is arranged to one side of said second conveyor opposite to said first conveyor and receives caps thereon displaced from said second conveyor due to an excess of caps thereon, and the bottom end of said cap return chute which is in communication with said bin also extends across the bottom of said cap surface return means for the return of caps received thereon.

9. The device of claim 5 wherein said second conveyor at the area of association of said guide means therewith and extending upwardly therefrom is provided with cover means spaced from said second conveyor for confining the caps for movement therebetween, said cover means including laterally adjustable means which forms a side guide for defining the path of the caps on said second conveyor and enables the effective width of said second conveyor to be adjusted so as to accommodate caps of different sizes.

10. A high speed closure cap delivery device adapted for use with metallic caps, said device comprising an open top bin for receiving a supply of caps in random arrangement and having a cap delivery opening, a first magnetized vertically directed endless conveyor of substantial width arranged with the lower end portion thereof in close association with said cap delivery opening to magnetically pick up a relatively great number of caps in flat condition thereon from said bin and lift the same above said bin, drive means connected to said first conveyor to drive the same at a relatively slow speed, a second magnetized vertically directed endless conveyor arranged at one side of said first conveyor above said bin and in close association therewith throughout a substantial portion of said first conveyor, said second conveyor being of a width limited to the accommodation of a single line of caps and extending substantially upwardly beyond the upper end of said first conveyor, drive means connected to said second conveyor to drive the same at a high speed, cap guide means extending angularly across the upper portion of said first conveyor in the direction of said second conveyor so as to deliver caps on said first conveyor to said second conveyor in side-by-side flat condition and in random facing arrangement, a downwardly inclined cap delivery chute having an upper cap receiving entrance disposed at the upper end of said second conveyor, means at the upper end of said second conveyor for guiding upwardly traveling caps from said second conveyor into said chute for delivery to a capping machine, and an excess cap return means at the lower end of said second conveyor which places the lower end of said second conveyor in communication with said bin for return to said bin of excess caps when the caps directed onto said second conveyor from said first conveyor are in excess of the number required for arrangement of a single line of caps on said second conveyor.

11. A high speed closure cap sorting and delivery device adapted for use with metallic caps having a depending annular skirt portion, said device comprising a cap supply bin in which the caps are disposed in random position, a first magnetized vertically directed endless belt conveyor of substantial width arranged with the lower end portion thereof in close association with said cap storage means to receive caps in flat condition thereon and lift the same from said storage means, drive means connected to said first conveyor to drive the same at a relatively slow speed, a second magnetized vertically directed endless belt conveyor arranged to one side of said first conveyor in close association therewith throughout a substantial portion of said first conveyor above said supply bin, said second conveyor being of a width limited to the accommodation of a single line of caps and extending substantially upwardly beyond said first conveyor, drive means connected to said second conveyor to drive the same at a relatively high speed, cap guide means extending angularly across an upper portion of said first conveyor in the direction of said second conveyor operative to transfer the caps to said second conveyor, said second conveyor being in communication adjacent its upper end with the upper end of a downwardly inclined cap feed chute for gravity feed of accepted caps to a capping machine, said second conveyor being also in communication adjacent its upper end with a downwardly directed rejected cap return chute which is in communication with said supply bin, and cap sorting means adjacent the upper end of said second conveyor which is operative to accept and reject caps according to the position in which the caps face and to direct the same into either said cap feed chute or said cap return chute, said cap sorting means being operative on the caps while they are advancing upwardly on said second vertically directed conveyor and said caps moving into said cap feed chute or said return chute while they are advancing in the plane of said second conveyor.

12. A high speed closure cap sorting and delivery device adapted for use with metallic caps, said device comprising cap storage means in the form of an open top bin including a lower cap delivery opening, a first magnetized vertically directed endless belt conveyor of a width sufficient to accommodate a plurality of caps positioned transversely thereon, said first conveyor being arranged with the lower end portion thereof in close association with said cap delivery opening to receive caps in flat condition thereon from said bin and lift the same above said bin, drive means connected to said first conveyor to drive the same at a relatively slow speed, a second magnetized vertically directed endless belt conveyor arranged to one side of said first conveyor in close association therewith throughout a substantial portion of said first conveyor above said bin, said second conveyor being of a width limited to the accommodation of a single line of caps and extending substantially upwardly beyond the upper end of said first conveyor, drive means connected to said second conveyor to drive the same at a high speed, cap guide means extending angularly across an upper portion of said first conveyor in the direction of said second conveyor for transferring the caps to said second conveyor, the upper end portion of said second conveyor being in communication at one side thereof with a downwardly inclined cap delivery chute for gravity feed of accepted caps to a capping machine, said upper end portion being in communication at the opposite side thereof with a downwardly directed cap return chute which is in communication with said bin, guide means at the upper end of said second conveyor for limiting the upward movement of caps on said conveyor, and cap sorting means spaced below said guide means at the upper end of said second conveyor and cooperating therewith to direct the caps either into said cap delivery means or said return chute with the caps moving into said cap delivery means or said return chute while they are traveling in the plane of the upwardly extending portion of said second conveyor.

13. A cap handling apparatus for supplying caps to a feed chute for a capping machine or the like from a storage bin where the caps are disposed in random arrangement, said apparatus comprising a cap storage bin having a side opening, a relatively slow speed magnetic belt conveyor of a width to accommodate more than a single line of caps arranged in a generally vertical plane with its lower end in the side opening in the storage bin so as to pick up caps from the bin, a relatively high speed single line magnetic belt conveyor disposed in coplanar side-by-side relation with the slow speed conveyor and traveling in the same upward direction, an inclined guide member for directing caps from the slow speed conveyor onto the high speed conveyor at a transfer area for delivery at the uppermost end of said high speed conveyor, a downwardly directed cap chute having an open upper end at the side of the upper end of the high speed conveyor, the high speed conveyor having its lower end in communication with the storage bin so as to permit return to the latter of caps delivered by operation of said inclined guide member to the transfer area in excess of the number required for forming a single line on the high speed conveyor and a cap return chute having an open upper end at the side of the upper end of the high speed conveyor which is opposite the open upper end of the cap feed chute for return to the storage bin of caps which are not accepted at the upper end of the feed chute, said upper end of said downwardly directed cap chute and said upper end of said cap return chute being in the same vertical plane as the upper end of said high speed conveyor.

14. A cap handling apparatus as recited in claim 13, and a cap guide member extending in the plane of the high speed conveyor and in the upward path of the caps at the upper end of the high speed conveyor and having cap skirt engaging guide surfaces positioned to normally divert the caps into the cap feed chute and to cause the caps to advance in the plane of the high speed conveyor into the return chute when passage into the feed chute is blocked.

15. A high speed closure cap handling device adapted for use with metallic caps having a top panel and a depending annular skirt, said device comprising a cap storage bin having a cap delivery opening, a first magnetized, vertically directed endless belt conveyor of a width sufficient to accommodate a plurality of caps positioned transversely thereon, said first conveyor being arranged with a lower portion thereof in close association with said cap delivery opening to receive caps in flat condition thereon from said bin and lift the same above said bin, drive means connected to said first conveyor to drive the same at a relatively slow speed, a second magnetized vertically directed endless belt conveyor arranged to one side of said first conveyor in close association therewith throughout a substantial portion of said first conveyor above said bin, said second conveyor being of a width limited to the accommodation of a single line of caps and extending substantially upwardly beyond the upper end of said first conveyor, drive means connected to said second conveyor to drive the same at a high speed, cap guide means extending angularly across an upper portion of said first conveyor in the direction of said second conveyor for transferring the caps to a lower portion of said second conveyor an upper portion of said second conveyor being in communication at a lateral side thereof with a downwardly inclined cap delivery chute for gravity feed of accepted caps to a capping machine, said upper end portion being in communication at the opposite side thereof with a downwardly directed cap return chute which is in communication with said bin, and cap guide means at the upper end of said second conveyor for limiting the upward movement of caps on said conveyor and for directing the upwardly advancing caps either into said cap delivery means or into said return chute.

16. A high speed closure cap handling device as recited in claim 15, and a cap orienting device associated with said cap delivery chute for sensing the direction each cap is facing in the chute and for orienting caps which face in a predetermined direction whereby all the caps which are delivered to the capping machine are facing in the same direction.

17. A high speed closure cap delivery device adapted for use with metallic caps having a top panel and a depending skirt, said device comprising means in the form of a bin having a cap delivery opening for storing a supply of the caps, a first magnetized vertically directed endless belt conveyor of substantial width arranged with a lower portion thereof in close association with said cap delivery opening to magnetically pick up from said bin a relatively great number of caps in flat, random facing condition thereon and spread across the face thereof and to lift the same above said bin, drive means connected to said first conveyor to drive the same at a relatively slow speed, a second magnetized vertically directed endless belt conveyor arranged at one side of said first conveyor in close association therewith throughout a substantial portion of said first conveyor above said bin, said second conveyor being of a width limited to the accommodation of a single line of caps and extending substantially upwardly beyond said first conveyor, drive means connected to said second conveyor to drive the same at a high speed, cap guide means extending angularly across the upper portion of said first conveyor in the direction of said second conveyor so as to guide the caps on said first conveyor onto said second conveyor in side-by-side flat condition and in single line random facing arrangement, a downwardly inclined cap delivery chute having an upper cap receiving entrance disposed adjacent the upper end of said second conveyor, a cap guide member extending into the upward path of the caps on said second conveyor at the cap receiving entrance of said chute for guiding caps from said second conveyor into said chute for delivery to a capping machine, an excess cap return means at the lower end of said conveyor which places the lower end of said second conveyor in communication with said cap storage means for return to said cap storage means of caps which are directed by said angularly extending cap guide means onto said second conveyor from said first conveyor in excess of the number required for arrangement of a single line of caps on said second conveyor.

18. A high speed closure cap delivery device as recited in claim 17, and a cap position sensing and orienting device associated with said cap delivery chute and operative to pass caps which are delivered to said chute with the top panel facing in one direction and to reverse the position of caps delivered to said chute which face in the opposite direction whereby all the caps are delivered by said cap delivery chute with the top panel facing in said one direction.

References Cited by the Examiner

UNITED STATES PATENTS

| | | | |
|---|---|---|---|
| 1,195,054 | 8/1916 | McLeod | 209—72 |
| 1,406,963 | 2/1922 | Angus | 209—72.1 |
| 1,644,999 | 10/1927 | Hardiman | 209—72.11 |
| 1,773,646 | 8/1930 | Skov | 198—41 |
| 2,176,659 | 10/1939 | Mundy | 209—72.1 |
| 2,336,606 | 12/1943 | Everett | 209—72.11 |
| 2,651,402 | 9/1953 | Noyes | 209—72 X |
| 2,936,060 | 5/1960 | Carter | 198—32 X |

ROBERT B. REEVES, *Primary Examiner.*